US012656941B2

(12) United States Patent
Chang et al.

(10) Patent No.: US 12,656,941 B2
(45) Date of Patent: Jun. 16, 2026

(54) METHOD, APPARATUS, DEVICE AND STORAGE MEDIUM FOR DISPLAY MODE SWITCHING

(71) Applicant: Beijing Zitiao Network Technology Co., Ltd., Beijing (CN)

(72) Inventors: Weiyi Chang, Beijing (CN); Ziyang Zheng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/622,773

(22) Filed: Mar. 29, 2024

(65) Prior Publication Data

US 2024/0248593 A1 Jul. 25, 2024

Related U.S. Application Data

(63) Continuation of application No. PCT/CN2022/138446, filed on Dec. 12, 2022.

(30) Foreign Application Priority Data

Dec. 22, 2021 (CN) .......................... 202111582797.7

(51) Int. Cl.
*G06F 3/04845* (2022.01)
*G06F 3/0488* (2022.01)

(52) U.S. Cl.
CPC ........ *G06F 3/04845* (2013.01); *G06F 3/0488* (2013.01); *G06F 2203/04806* (2013.01); *G06F 2203/04808* (2013.01)

(58) Field of Classification Search
CPC .............. G06F 3/04845; G06F 3/0488; G06F 2203/04806; G06F 2203/04808;
(Continued)

(56) References Cited

U.S. PATENT DOCUMENTS 5,491,781 A * 2/1996 Gasperina ........... G06F 3/04855
715/835
2003/0228909 A1* 12/2003 Tanaka .................... A63F 13/87
463/42
(Continued)

FOREIGN PATENT DOCUMENTS

CN 101957717 A 1/2011
CN 107357497 A 11/2017
(Continued)

OTHER PUBLICATIONS

Delta984, "'save video as . . . ' option when right clicking on a Youtube video is grayed out and wont work? Help.", Apr. 9, 2021, microsoft.com, https://answers.microsoft.com/en-us/microsoftedge/forum/all/save-video-as-option-when-right-clicking-on-a/52a96b79-7d9b-4f7b-9c68-444b5bcfd8eb, pp. 1-3 (Year: 2021).*
(Continued)

*Primary Examiner* — Daniel W Parcher

(57) ABSTRACT

The embodiment of the disclosure provides a method, an apparatus, a device and a storage medium for display mode switching. In the method, by receiving a user-triggered switching instruction for a playback interface, and in response to the switching instruction, the playback interface is switched among a first display mode, a second display mode and a third display mode. In the first display mode, text to be played on the playback interface and predetermined controls of the playback interface are hovered over an image to be played on the playback interface. In the second display mode, the playback interface comprises a first playback area and a second playback area. In the third display mode, the playback interface hides the text to be played and the predetermined controls.

20 Claims, 8 Drawing Sheets

(58) Field of Classification Search

CPC .... G06F 9/451; G06F 16/951; G06F 16/9577;
G06F 16/9566

See application file for complete search history.

(56) References Cited

U.S. PATENT DOCUMENTS

| | | | | |
|---|---|---|---|---|
| 2004/0095394 | A1* | 5/2004 | Fox | G06F 3/0481 |
| | | | | 715/800 |
| 2009/0063645 | A1* | 3/2009 | Casey | H04N 21/4788 |
| | | | | 709/206 |
| 2011/0113318 | A1 | 5/2011 | Hirosawa et al. | |
| 2011/0138354 | A1* | 6/2011 | Hertenstein | G06F 3/048 |
| | | | | 717/115 |
| 2011/0320938 | A1* | 12/2011 | Schorsch | G06T 3/40 |
| | | | | 715/269 |
| 2013/0031208 | A1* | 1/2013 | Linton | G09B 7/02 |
| | | | | 709/217 |
| 2013/0311942 | A1* | 11/2013 | Yoon | H04N 21/4438 |
| | | | | 715/800 |
| 2013/0334300 | A1* | 12/2013 | Evans | H04N 21/47217 |
| | | | | 235/494 |
| 2016/0269379 | A1* | 9/2016 | Livesay | H04L 63/0861 |
| 2018/0239519 | A1 | 8/2018 | Hinckley et al. | |
| 2018/0316964 | A1* | 11/2018 | Dillon | G06F 3/04817 |
| 2020/0334742 | A1* | 10/2020 | Stewart | H04L 65/4015 |
| 2021/0099405 | A1* | 4/2021 | Al Majid | H04L 51/222 |
| 2022/0385984 | A1 | 12/2022 | Yuan et al. | |
| 2024/0212064 | A1 | 6/2024 | Wang et al. | |

FOREIGN PATENT DOCUMENTS

| | | | |
|---|---|---|---|
| CN | 107613402 | A | 1/2018 |
| CN | 106131686 | B | 6/2019 |
| CN | 109842818 | A | 6/2019 |
| CN | 110308835 | A | 10/2019 |
| CN | 111294637 | A | 6/2020 |
| CN | 107341018 | B | 12/2020 |
| CN | 112511905 | A | 3/2021 |
| CN | 306596720 | S | 6/2021 |
| CN | 113115096 | A | 7/2021 |
| CN | 113126839 | A | 7/2021 |
| CN | 113253897 | A | 8/2021 |
| CN | 113395556 | A | 9/2021 |
| CN | 113655930 | A | 11/2021 |
| CN | 113703643 | A | 11/2021 |
| CN | 115048164 | A | 9/2022 |

OTHER PUBLICATIONS

Office action received from Chinese patent application No. 202111582797.7 mailed on Jun. 6, 2024, 28 pages (9 pages English Translation and 19 pages Original Copy).

Notice of Second Examination Opinion for Chinese Application No. 202111582797.7 , mailed Oct. 9, 2024, 18 pages.

Extended European Search Report for European Application No. 22909803.3, mailed Feb. 10, 2025, 9 pages.

\* cited by examiner

RECEIVE A USER-TRIGGERED SWITCHING INSTRUCTION FOR A PLAYBACK INTERFACE ⟋S101

IN RESPONSE TO THE SWITCHING INSTRUCTION, SWITCH THE PLAYBACK INTERFACE AMONG A FIRST DISPLAY MODE, A SECOND DISPLAY MODE AND A THIRD DISPLAY MODE ⟋S102

PLACE   FOLLOW   RECOMMENDED

XXXXXX

XXXXXXXXXXXXXXXXXXXXXXX
XXXXXXXXXXXXXX······60%

11

12

23

21

XXXXXX           FOLLOW

22

XXXXXXXXXXX
XXXXXXXXXXX
XXXXX
XXXXXXXXXXXXXXXXXXXXXX
XXXXXXXXXXXXX

31

32   33

TRIGGER THE FIRST SWITCHING INSTRUCTION WHEN A FIRST TRIGGER CONDITION IS MET /S201

IN RESPONSE TO THE FIRST SWITCHING INSTRUCTION, SWITCH THE PLAYBACK INTERFACE FROM THE FIRST DISPLAY MODE TO THE SECOND DISPLAY MODE /S202

TRIGGER THE FOURTH SWITCHING INSTRUCTION WHEN A FOURTH TRIGGER CONDITION IS MET — S501

IN RESPONSE TO THE FOURTH SWITCHING INSTRUCTION, SWITCH THE PLAYBACK INTERFACE FROM THE THIRD DISPLAY MODE TO THE SECOND DISPLAY MODE — S502

TRIGGER THE SIXTH SWITCHING INSTRUCTION WHEN A SIXTH TRIGGER CONDITION IS MET — S701

IN RESPONSE TO THE SIXTH SWITCHING INSTRUCTION, SWITCH THE PLAYBACK INTERFACE FROM THE FIRST DISPLAY MODE TO THE THIRD DISPLAY MODE — S702

METHOD, APPARATUS, DEVICE AND STORAGE MEDIUM FOR DISPLAY MODE SWITCHING

This application is a continuation of International Patent Application No. PCT/CN2022/138446, filed on Dec. 12, 2022, which claims the benefit of CN Patent Application No. 202111582797.7 filed on Dec. 22, 2021 entitled "METHOD, APPARATUS, DEVICE, AND STORAGE MEDIUM FOR DISPLAY MODE SWITCHING", both of which are incorporated herein by reference in their entireties.

FIELD

The disclosure relates to the technical field of information interaction, and in particular to, a method, an apparatus, a device and a storage medium for display mode switching.

BACKGROUND

With the continuous popularization of mobile terminals and the acceleration of network access speed, Internet application products have gradually gained the favor of users. Take video applications as an example, which may provide content in the form of videos or graphics for users to watch.

SUMMARY

The present disclosure provides a method, an apparatus, a device and a storage medium for display mode switching.

In a first aspect of the present disclosure, there is provided a method of display mode switching. The method comprises:

receiving a user-triggered switching instruction for a playback interface;

in response to the switching instruction, switching the playback interface among a first display mode, a second display mode and a third display mode;

wherein, in the first display mode, text to be played on the playback interface and predetermined controls of the play back interface are hovered over an image to be played on the playback interface: in the second display mode, the playback interface comprises a first play back area and a second playback area, the first play back area being configured to display the image to be played, the second playback area being configured to display the text to be played and the predetermined controls: in the third display mode, the playback interface hides the text to be played and the predetermined controls.

In a second aspect of the present disclosure, there is provided an apparatus for display mode switching. The apparatus comprises:

a receiving module, configured to receive a user-triggered switching instruction for a play back interface;

a switching module, configured to, in response to the switching instruction, switch the play back interface among a first display mode, a second display mode and a third display mode;

wherein, in the first display mode, text to be played on the playback interface and predetermined controls of the play back interface are hovered over an image to be played on the playback interface: in the second display mode, the playback interface comprises a first play back area and a second play back area, the first play back area being configured to display the image to be played, the second playback area being configured to display the text to be played and the predetermined controls: in the third display mode, the playback interface hides the text to be played and the predetermined controls.

In a third aspect of the present disclosure, there is provided an electronic device. The electronic device comprises:

a processor: and a memory, configured to store a computer program;

wherein the processor is configured to perform a method of display mode switching of the first aspect and various possible designs of the first aspect by executing the computer program.

In a fourth aspect of the present disclosure, there is provided a computer readable storage medium. Computer execution instructions are stored in the computer readable storage medium, which, when executed by a processor, perform a method of display mode switching of the first aspect and various possible designs of the first aspect.

In a fifth aspect of the present disclosure, there is provided a computer program product. The computer program product comprises a computer program which, when executed by a processor, performs a method of the first aspect and various possible designs of the first aspect.

In a sixth aspect of the present disclosure, there is provided a computer program. The computer program, when executed by a processor, performs a method of the first aspect and various possible designs of the first aspect.

BRIEF DESCRIPTION OF THE DRAWINGS

In order to more clearly describe the technical solution in the embodiments of the present disclosure or the prior art, a brief introduction is presented below to the drawings to be used in the description of the embodiments or the prior art. It is obvious that the drawings in the following description are merely some of the embodiments of the present disclosure, and those of ordinary skill in the art may further obtain other drawings according to these drawings without exercise of any inventive skill.

DETAILED DESCRIPTION

Figure 1:
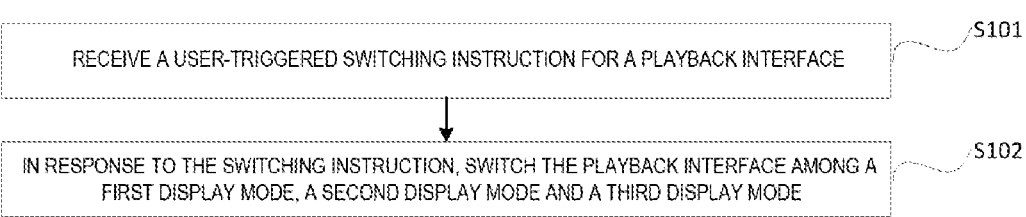
FIG. 1 is a schematic flowchart of a display mode switching method shown according to an example embodiment of the present disclosure.

The embodiments of the present disclosure will be described in more detail below with reference to the accompanying drawings. Although some embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for illustrative purposes and are not intended to limit the scope of protection of the present disclosure.

It should be understood that respective steps described in the method embodiments of the present disclosure may be performed in a different sequence and/or in parallel. In addition, the method embodiments may include additional steps and/or omit the execution of an illustrated step. The scope of the present disclosure is not limited in this respect.

In the description of the embodiments of the present disclosure, the term "including" and similar terms should be understood as open inclusion, that is, "including but not limited to". The term "based on" should be understood as "at least partially based on". The term "one embodiment" should be understood as "at least one embodiment". The term "some embodiments" should be understood as "at least some embodiments". Other explicit and implicit definitions may also be included below.

It should be noted that the modifications of "one" and "more" mentioned in the present disclosure are illustrative rather than restrictive. Those skilled in the art should be understood that unless indicated clearly in the context, otherwise it should be understood as "one or more".

In some cases, users have different demands on different types of content. For example, regarding content about food making, users often need to read the steps of food making methods; regarding film and television content, users often need to view the complete picture. At present, the presentation mode of different types of content is rather unitary and the user's controllability is weak.

The disclosure aims to: set a first display mode, a second display mode and a third display mode on a playback interface, and display images to be played and text to be played in different ways in the first display mode, the second display mode and the third display mode. The first display mode, the second display mode and the third display mode are switched among each other by switching instructions triggered by the user, that is, every two of the first display mode, the second display mode and the third display mode may be switched among each other based on switching instructions. It is noteworthy that the first display mode, the second display mode and the third display mode are stable playback modes, that is, the mode may be maintained without continuous operation by the user. In this way, it is possible for the user to switch to different display modes to watch the image to be played or read the text to be played.

Application scenarios of the display mode switching method provided in the present disclosure are illustrated below:

In an application scenario of the display mode switching method, the provided in the present embodiment can be applied to a scenario such as a video playback. When the user plays a video, the playback interface in the video may first adopt the first display mode, folding the text to be played and hovering it on the image to be played. If the user needs to view the complete text to be played, the user may switch to the second display mode to display the complete text to be played on the playback interface. If the user needs to remove the cover of the text to be played, the user may switch to the third display mode, thus hiding the text to be played.

In a further application scenario of the display mode switching method, the method provided in the present embodiment may also be applied to a bullet-screen comments playback scene. For a video with bullet-screen comments playback, the playback interface may first adopt the first display mode, folding bullet-screen comments to be played and hovering them on the image to be played. If the user needs to watch complete bullet-screen comments, the user may switch to the second display mode to display complete bullet-screen comments on the play back interface. If the user needs to remove the occlusion of bullet-screen comments to be played, the user may switch to the third display mode, thus hiding bullet-screen comments.

It is noteworthy that the above two application scenarios do not constitute any restrictions on the present disclosure, and the display mode switching method provided herein may be applied to any scenario where a display mode needs to be switched.

It may be understood that the display mode switching method may be implemented by a display mode switching apparatus provided in the embodiments of the present disclosure, which may be part or all of a device, such as a terminal device or a processor of a terminal device.

The technical solution of the embodiments of the present disclosure will be described in detail in with specific embodiments below: These specific embodiments may be combined with each other, and the same or similar concepts or processes might not be repeated in some embodiments.

FIG. 1 is a schematic flowchart of a display mode switching method shown according to an example embodiment of the present disclosure. As shown in FIG. 1, the display mode switching method provided in the present embodiment comprises:

Step 101: receiving a user-triggered switching instruction for a play back interface.

Step 102: in response to the switching instruction, switching the playback interface among a first display mode, a second display mode and a third display mode.

Wherein the play back interface may be an interface that plays images in a video playback application such as video and long video. In the embodiments of the present disclosure, the playback interface may display images to be played or text to be played, and may be provided with controls to interact with users.

In the embodiments of the present disclosure, the playback interface may be switched among different display modes under the direction of a user-triggered switching instruction. Wherein different display modes display images to be played and texts to be played in different ways. In some embodiments, the playback interface may contain a first display mode, a second display mode, and a third display mode.

The first display mode, the second display mode and the third display mode are respectively described below:

In some embodiments, the text to be played for the playback interface and predetermined controls for the playback interface are hovered over the image to be played for the play back interface in the first display mode.

It should be understood that in the first display mode, "hover" may be understood as displaying the image to be played at the bottom of the playback interface, superimposing the text to be played and the predetermined controls on the image to be played at a predetermined position of the play back interface, covering part of the content of the image to be played.

It should be understood that the position of hovering the text to be played and the predetermined controls are not intended to be limited in the embodiments of the present disclosure, which be set according to the actual situation.

Figure 2:
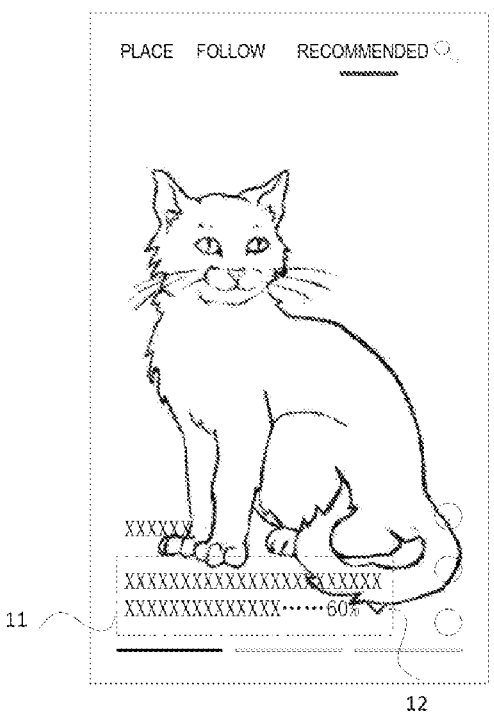
FIG. 2 is a schematic diagram of a first display mode shown according to an example embodiment of the present disclosure.

As an example, FIG. 2 is a schematic diagram of the first display mode shown according to an example embodiment of the present disclosure. As shown in FIG. 2, in the first display mode, multiple images to be played are displayed at the bottom of the playback interface, and the users may switch multiple images to be played by swiping. In the lower left corner of the play back interface, the text to be played is hovered on the images to be played for the user to read. On the top of the play back interface, predetermined controls are set for recommendations, searches and other functions. On the right of the play back interface, there are also predetermined controls for like, comment, repost and other functions.

Still refer to FIG. 2. In the first display mode, a text display area 11 with a fixed position may be set in the play back interface to hover the text to be played. If the text display area 11 in the first display mode is smaller than an area required to display the text to be played, the text to be played is folded in the text display area.

Wherein, the text display area is provided with a first control 12, which is configured to expand the folded text to be played. Text folding information is also displayed in the text display area 11, which is configured to characterize a folding proportion of the text to be played.

As an example, if the text to be played is too large and the text display area 11 can only display 40% of the content, then the text display area 11 may fold the text to be played, displaying only the first 40% of the text to be played and folding the subsequent content displaying ellipses. At the end of the text display area 11, the folding proportion of the text to be played, 60% may be displayed, and the first control 12 may be displayed. If the user needs to read the full text to be played, he/she may switch the display mode by clicking on the first control 12, so that the play back interface displays the full text to be played.

In some embodiments, the first display mode may further be set as a default display mode of the play back interface. When the user browses a new video, the playback interface may adopt the first display mode by default. After receiving the user-triggered switching instruction, the first display mode may be switched to other display mode.

In some embodiments, the playback interface in the second display mode comprises a first play back area and a second play back area, the first play back area being configured to display the image to be played, and the second playback area being configured to display the text to be played and predetermined controls.

It should be understood that the embodiments of the present disclosure do not intend to limit how the first and second playback areas are divided, which may be divided alongside or in parallel. The embodiments of the present disclosure also do not limit the sizes of the first and second playing areas. As an example, the first playing area may occupy 60% of a playback interface, and the second playing area may occupy 30% thereof.

In some embodiments, input boxes and predetermined controls may also be provided on the playback interface in the second display mode. As an example, the input box may be configured to enter comments, and the predetermined controls may be configured to trigger actions such as likes, favorites, and reposts.

Figure 3:
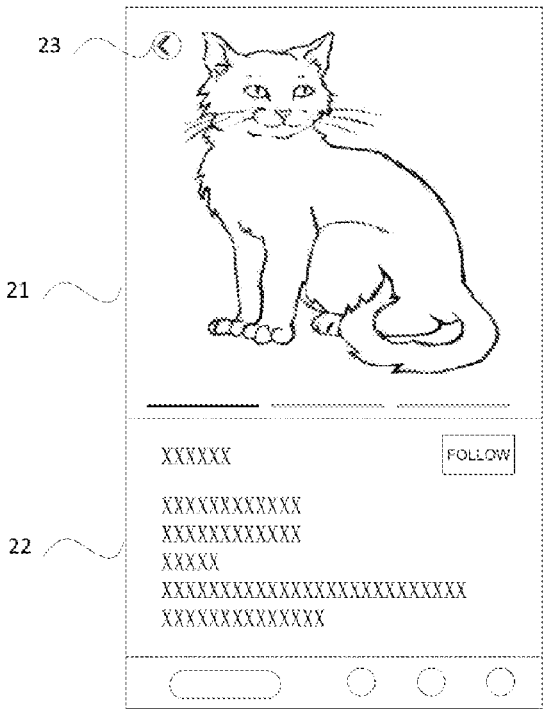
FIG. 3 is a schematic diagram of a second display mode shown according to an example embodiment of the present disclosure.

As an example, FIG. 3 is a schematic diagram of the second display mode shown according to an example embodiment of the present disclosure. As shown in FIG. 3, in the second display mode, the playback interface may be divided into two areas, upper and lower, as the first playback area 21 and the second playback area 22, so that the first play back area 21 and the second playback area 22 are distributed alongside. In the first playback area 21, the image to be played may be displayed after being reduced, and the user can switch the image to be played by swiping left and right. In the second play back area 22, the full text to be played may be displayed, and the user may adjust the display position of the text to be played by scrolling up and down. At the bottom of the playback interface, there are also input boxes and predetermined controls for the user to enter comments or perform actions such as likes, favorites and reposts.

Still refer to FIG. 3. In the second display mode, a fifth control 23 may further be set in the upper left corner of the first playback area, and when the user triggers the fifth control 23, the second display mode may be switched to the first display mode.

It is noteworthy that for the second display mode, since a separate second play back area is provided to display the full text to be played, it may be guaranteed that the user may read the full text to be played.

In some embodiments, the playback interface hides the text to be played and the predetermined controls in the third display mode.

It should be understood that hiding the text to be played and the predetermined controls may be construed as not showing the text to be played and the predetermined controls in the third display mode.

In some embodiments, a second control is further displayed on the playback interface in the third display mode, which is configured to trigger a download instruction for the image to be played after being clicking on.

In some embodiments, the second control may also have different triggering permissions, and it may be indicated through different colors displayed by the second control whether the second control has the permission to trigger the download instruction for the image to be played. As an example, if the color of the second control is the same as that of other control (e.g., the second control and other control are both white), the second control has the permission to trigger the download instruction for the image to be played, and the user may download the image to be played by clicking on the second control. If the color of the second control is different from that of other control (e.g., the second control is gray, while other control is white), the second control does not have the permission to trigger the download instruction for the image to be played, and the user cannot download the image to be played by clicking on the second control.

In some embodiments, a third control is further provided on the playback interface in the third display mode, which, when triggered, is configured to switch the playback interface back to the display mode before the previous switching instruction was triggered.

As an example, if the third display mode is switched from the first display mode, the user may switch the playback interface from the third display mode back to the first display mode when clicking on the third control. If the third display mode is switched from the second display mode, then the user may switch the playback interface from the third display mode to the second display mode when clicking on the third control.

In other embodiments, a fourth control is further provided on the playback interface in the third display mode, which, when triggered, is configured to switch the play back interface back to the second display mode.

Figure 4:
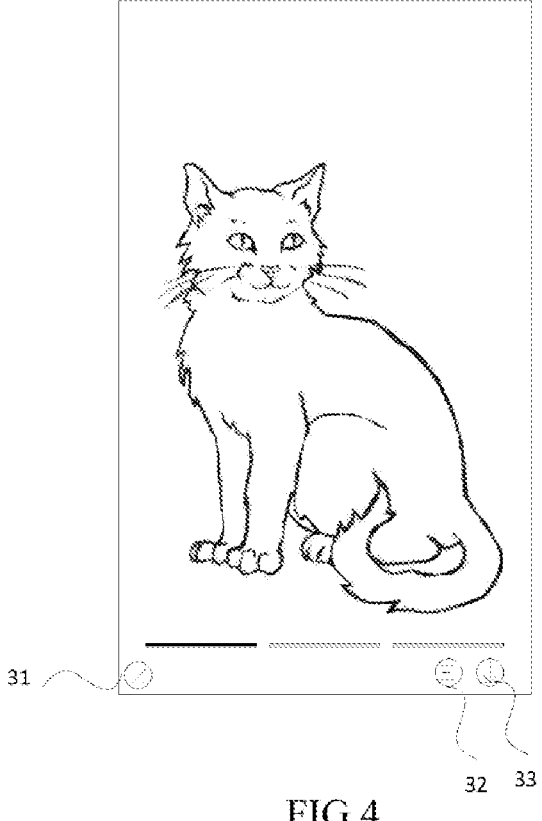
FIG. 4 is a schematic diagram of a third display mode shown according to an example embodiment of the present disclosure.

As an example, FIG. 4 is a schematic diagram of the third display mode shown according to an example embodiment of the present disclosure. As shown in FIG. 4, in the third display mode, the image to be played is displayed on the play back interface, and the text to be played and the predetermined controls are hidden so that the image to be played is not covered. In the lower left corner of the image to be played, a third control 31 is displayed, and in the lower right corner of the image to be played, a fourth control 32 and a second control 33 are displayed from left to right.

It is noteworthy that for the third display mode, since the text to be played and predetermined controls are hidden, it can be guaranteed that the image to be played is not covered.

In the embodiments of the present disclosure, the switching mode indicated by the switching instruction may be set by the user or the software developer, which is not intended to be limited in the embodiments of the present disclosure. In some embodiments, the user may trigger different switching instructions through different actions. As an example, the switching instruction may include a first switching instruction, a second switching instruction, a third switching instruction, a fourth switching instruction, a fifth switching instruction, and a sixth switching instruction, thus indicating different switching modes among the first display mode, the second display mode, and the third display mode, respectively.

As an example, the first switching instruction is configured to switch the playback interface from the first display mode to the second display mode, and the first switching instruction is triggered when a first trigger condition is met. The first trigger condition may include clicking on the first control, clicking on the text display area of the playback interface, or performing a two-finger drag to zoom in on the text display area.

As an example, the second switching instruction is configured to indicate that the playback interface is switched from the second display mode to the third display mode, and the second switching instruction is triggered when a second trigger condition is met. The second trigger condition may include clicking on the first play back area.

As an example, the third switching instruction is configured to indicate that the play back interface is switched from the third display mode to the first display mode, and the third switching instruction is triggered when a third trigger condition is met. The third trigger condition may include swiping the image to be played or clicking on the third control.

As an example, the fourth switching instruction is configured to indicate that the playback interface is switched from the third display mode to the second display mode, and the fourth switching instruction is triggered when a fourth trigger condition is met. The fourth trigger condition may include clicking on the image to be played, performing a two-finger drag to zoom out on the playback interface, clicking on the third control, or clicking on a fourth control which is configured to switch the playback interface back to the second display mode when triggered.

As an example, the fifth switching instruction is configured to indicate that the play back interface is switched from the second display mode to the first display mode, and the fifth switching instruction is triggered when a fifth trigger condition is met. The fifth trigger condition may include clicking on a fifth control arranged on the playback interface in the second display mode, which is configured to switch the play back interface back to the first display mode when triggered.

As an example, the sixth switch instruction is configured to indicate that the playback interface is switched from the first display mode to the third display mode, and the fifth switching instruction is triggered when a sixth trigger condition is met. The sixth trigger condition may include a two-finger drag to zoom in on the area of the image to be played.

It is noteworthy that the trigger conditions corresponding to the above six switching instructions do not constitute any restrictions, and appropriate trigger conditions may be set in practical applications.

In the embodiments of the present disclosure, the trigger conditions for the above six switching instructions are simple with low costs for user learning, so that it is guaranteed that the user may quickly switch among the three display modes and select an appropriate one to view the image to be played or read the text to be played.

In some embodiments, the user may further trigger a change instruction for playback content by operating the display interface, and the terminal device, in response to the switching instruction for playback content triggered by the user, changes the playback content in the playback interface while maintaining a current display mode. Wherein, the current display mode comprises the first display mode, the second display mode or the third display mode. In this way, the playback content may be switched normally in each display mode.

It should be understood that the embodiments of the present disclosure do not restrict the operation that triggers the change instruction, and may, as an example, be an operation of scrolling up or down in the display interface. The embodiments of the present disclosure also do not limit the playback content, which may be video, images, text and other content.

In the display mode switching method provided by the embodiments of the present disclosure, by receiving a user-triggered switching instruction for a playback interface and in response to the switching instruction, the playback interface is switched among a first display mode, a second display mode and a third display mode. Wherein, in the first display mode, text to be played on the play back interface and predetermined controls of the playback interface are hovered over an image to be played on the playback interface: in the second display mode, the play back interface comprises a first playback area and a second playback area, the first play back area being configured to display the image to be played, the second playback area being configured to display the text to be played and the predetermined controls: in the third display mode, the playback interface hides the text to be played and the predetermined controls. In this way, the play back interface may be switched among the different display modes, so that users may use different display modes to view the image to be played or read the text to be played.

The foregoing switching instructions will be illustrated with a specific switching process.

Figure 5:
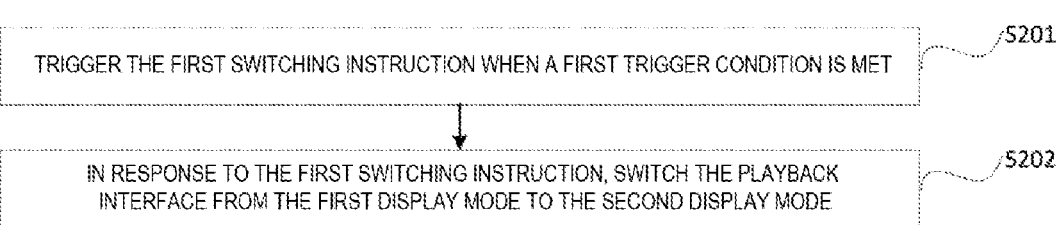
FIG. 5 is a schematic flowchart of a display mode switching method shown according to a further example embodiment of the present disclosure.
Figure 6:
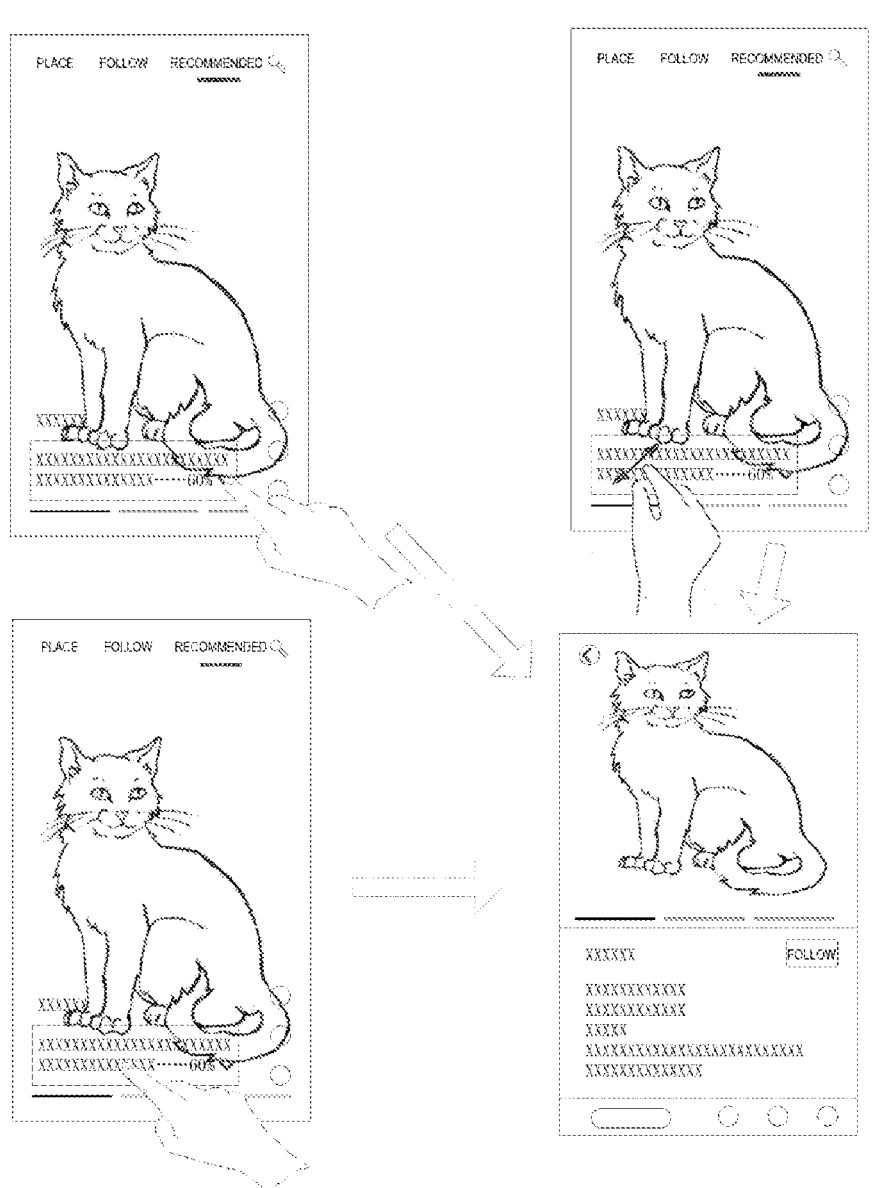
FIG. 6 is a schematic diagram of switching from the first display mode to the second display mode according to an example embodiment of the present disclosure.

FIG. 5 is a schematic flowchart of a display mode switching method shown in a further example embodiment of the present disclosure. FIG. 6 is a schematic diagram of switching from the first display mode to the second display mode according to an example embodiment of the present disclosure. As shown in FIGS. 5 and 6, the display mode switching method provided by the present embodiment comprises:

Step 201: trigger a first switching instruction when a first trigger condition is met.

Step 202: in response to the first switching instruction, switching the playback interface from the first display mode to the second display mode.

It should be understood that the embodiments of the present disclosure do not intend to restrict the first trigger condition, which in some embodiments includes clicking on a first control, clicking on the text display area of the playback interface, or performing a two-finger drag to zoom in on the text display area.

Wherein, the two-finger drag to zoom in is an operation that two fingers click on the screen and drag away.

For example, with reference to FIG. 6, when the user clicks on the first control, clicks on the text display area or performs the two-finger drag to zoom in on the text display area, the play back interface is switched from the first display mode to the second display mode.

Figure 7:
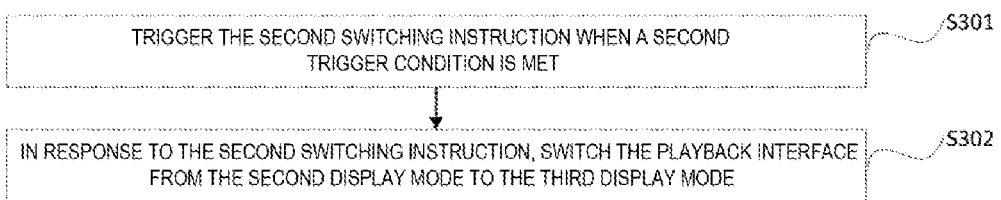
FIG. 7 is a schematic flowchart of a display mode switching method shown according to a still further example embodiment of the present disclosure.
Figure 8:
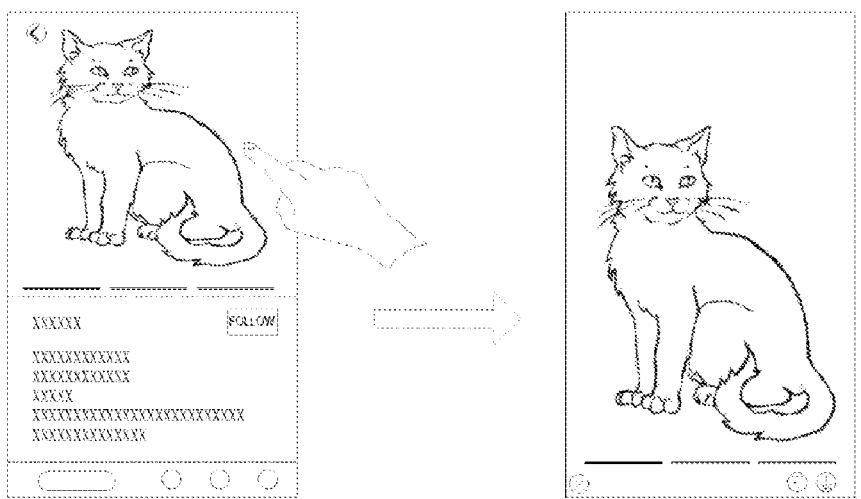
FIG. 8 is a schematic diagram of switching the second display mode to the third display mode shown according to an example embodiment of the present disclosure.

FIG. 7 is a schematic flowchart of a display mode switching method shown according to a still further example embodiment of the present disclosure. FIG. 8 is a schematic diagram of switching from the second display mode to the third display mode shown according to an example embodiment of the present disclosure. As shown in FIGS. 7 and 8, the display mode switching method provided by the present embodiment comprises:

Step 301: triggering the second switching instruction when a second trigger condition is met.

Step 302: in response to the second switching instruction, switching the play back interface from the second display mode to the third display mode.

It should be understood that the embodiments of the present disclosure do not intend to restrict the second trigger condition, which in some embodiments includes clicking on the first play back area.

It is noteworthy that clicking on the first playback area may be construed as clicking anywhere on the first playback area.

As an example, with reference to FIG. 8, when the user clicks on the first play back area, the play back interface is switched from the second display mode to the third display mode.

Figure 9:
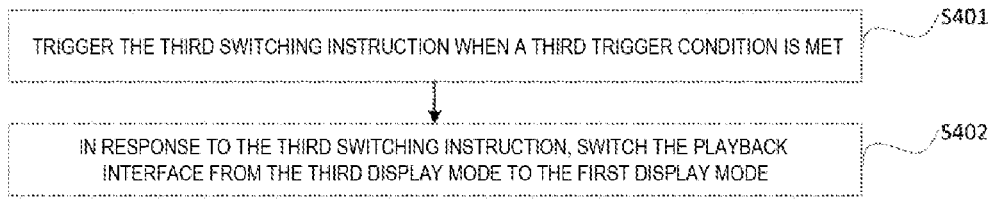
FIG. 9 is a schematic flowchart of a display mode switching method shown according to a still further example embodiment of the present disclosure.
Figure 10:
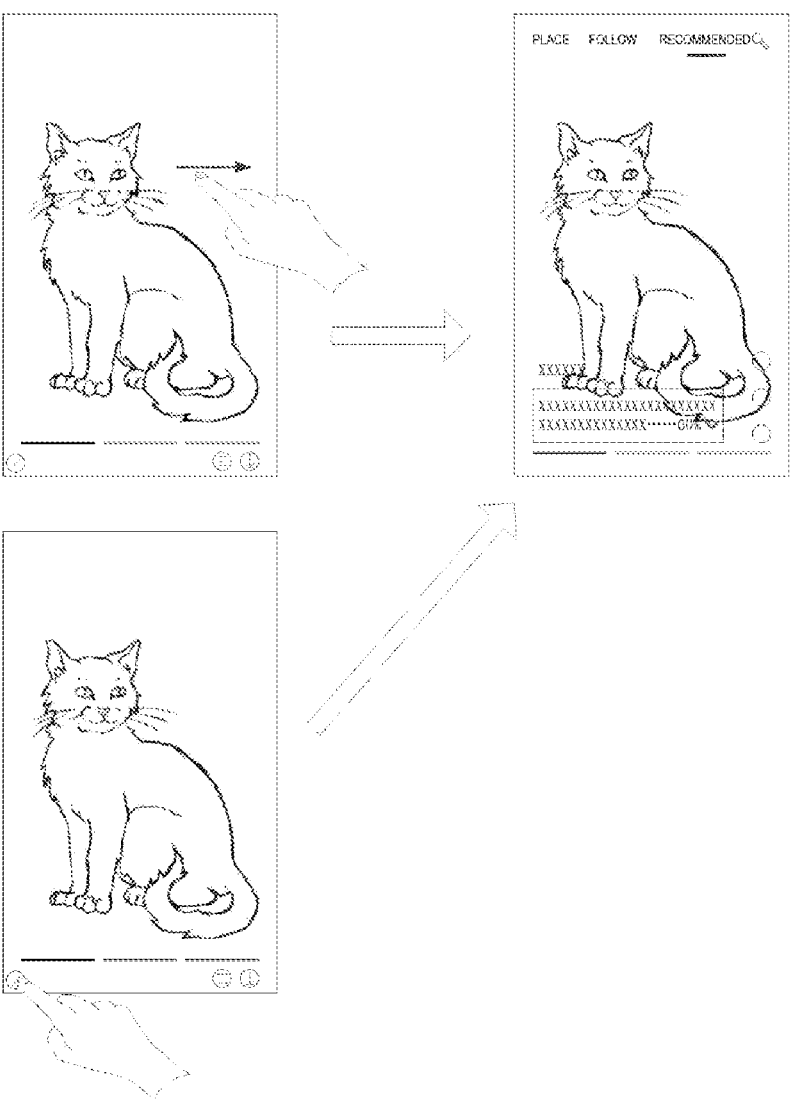
FIG. 10 is a schematic diagram of switching from the third display mode to the first display mode shown according to an example embodiment of the present disclosure.

FIG. 9 is a schematic flowchart of a display mode switching method shown according to a still further example embodiment of the present disclosure. FIG. 10 is a schematic diagram of switching from the third display mode to the first display mode shown according to an example embodiment of the present disclosure. As shown in FIGS. 9 and 10, the display mode switching method provided by the present embodiment comprises:

Step 401: triggering the third switching instruction when a third trigger condition is met.

Step 402: in response to the third switching instruction, switching the play back interface from the third display mode to the first display mode.

It should be understood that the embodiments of the present disclosure do not intend to restrict the third trigger condition, which in some embodiments includes swiping the image to be played or clicking on the third control.

It is noteworthy that the embodiments of the present disclosure do not intend to restrict the direction of swiping the image to be played in the third trigger condition, which may be swiping left or right.

It is noteworthy that if the third display mode is switched from the first display mode, it may be switched back to the first display mode by clicking on the third control: if the third display mode is switched from the second display mode, it cannot be switched back to the first display mode by clicking on the third control.

As an example, with reference to FIG. 10, when the user swipes left or right to play the image, the play back interface will be switched from the third display mode to the first display mode. If the third display mode is switched from the first display mode, the third display mode may be switched to the first display mode by clicking on the third control.

Figure 11:
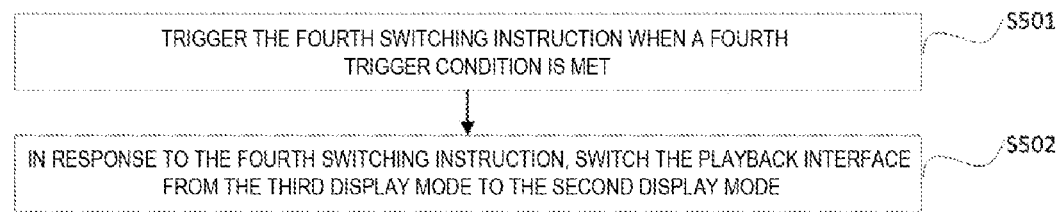
FIG. 11 is a schematic flowchart of a display mode switching method shown according to a still further example embodiment of the present disclosure.
Figure 12:
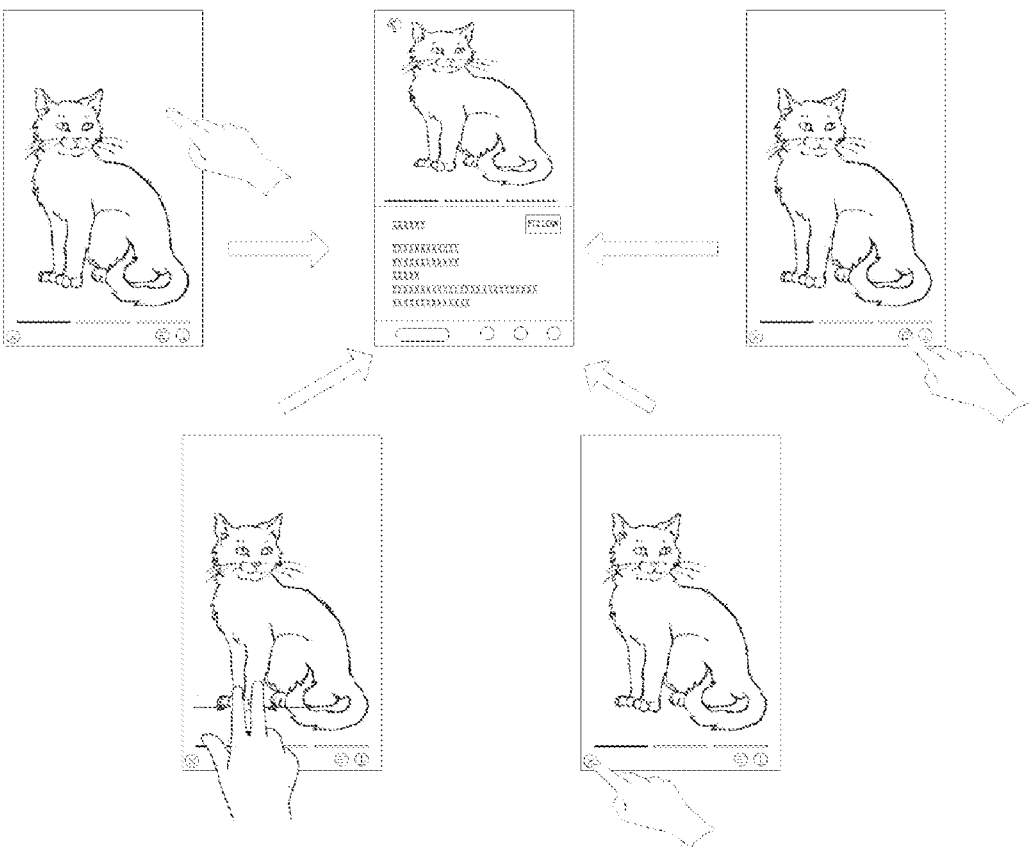
FIG. 12 is a schematic diagram of switching from the third display mode to the second display mode shown according to an example embodiment of the present disclosure.

FIG. 11 is a schematic flowchart of a display mode switching method shown according to a still further example embodiment of the present disclosure. FIG. 12 is a schematic diagram of switching from the third display mode to the second display mode shown according to an example embodiment of the present disclosure. As shown in FIGS. 11 and 12, the display mode switching method provided by the present embodiment comprises:

Step 501: triggering the fourth switching instruction when a fourth trigger condition is met.

Step 502: in response to the fourth switching instruction, switching the play back interface from the third display mode to the second display mode.

It should be understood that the embodiments of the present disclosure do not restrict the fourth trigger condition, which in some embodiments includes clicking on the image to be played, performing a two-finger drag to zoom out on the play back interface, clicking on the third control, or clicking on a fourth control which is configured to switch the play back interface back to the second display mode when triggered.

It is noteworthy that the two-finger drag to zoom out is an operation that two fingers click on the screen and drag closer.

It is noteworthy that the third display mode, if switched from the second display mode, may be switched back to the second display mode by clicking on the third control. The third display mode, if switched from the first display mode, cannot be switched back to the second display mode by clicking on the third control.

As an example, with reference to FIG. 12, when the user clicks on the image to be played, performs a two-finger drag to zoom out on the play back interface or clicks on the fourth control, the play back interface will be switched from the third display mode to the second display mode. If the third display mode is switched from the second display mode, it may further be switched back to the second display mode by clicking on the third control.

Figure 13:
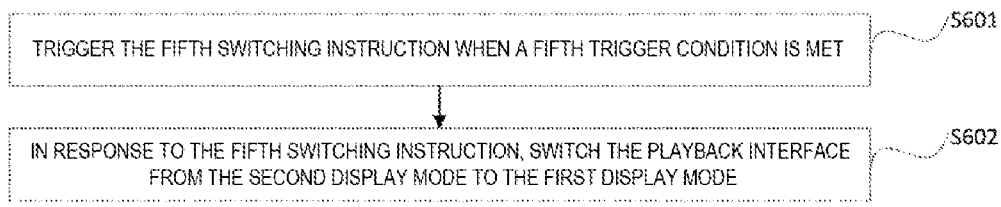
FIG. 13 is a schematic flowchart of a display mode switching method shown according to a still further example embodiment of the present disclosure.
Figure 14:
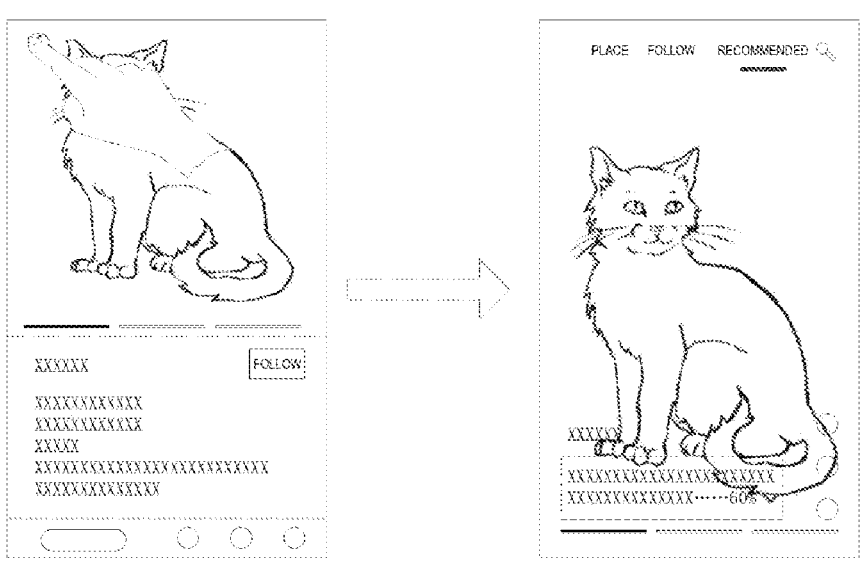
FIG. 14 is a schematic diagram of switching from the second display mode to the first display mode shown according to an example embodiment of the present disclosure.

FIG. 13 is a schematic flowchart of a display mode switching method shown according to a still further example embodiment of the present disclosure. FIG. 14 is a schematic diagram of switching from the second display mode to the first display mode shown according to an example embodiment of the present disclosure. As shown in FIGS. 13 and 14, the display mode switching method provided by the present embodiment comprises:

Step 601: triggering the fifth switching instruction when a fifth trigger condition is met.

Step 602: in response to the fifth switching instruction, switching the play back interface from the second display mode to the first display mode.

It should be understood that the embodiments of the present disclosure do not restrict the fifth trigger condition, which in some embodiments includes clicking on a fifth control arranged on the play back interface in the second display mode, which is configured to switch the play back interface back to the first display mode when triggered.

It is noteworthy that the embodiments of the present disclosure do not intend to restrict the position of the fifth control, which, e.g., may be arranged in the upper left corner of the first playback area, as shown in FIG. 3.

As an example, with reference to FIG. 14, when the user clicks on the fifth control, the second display mode is switched to the first display mode.

Figure 15:
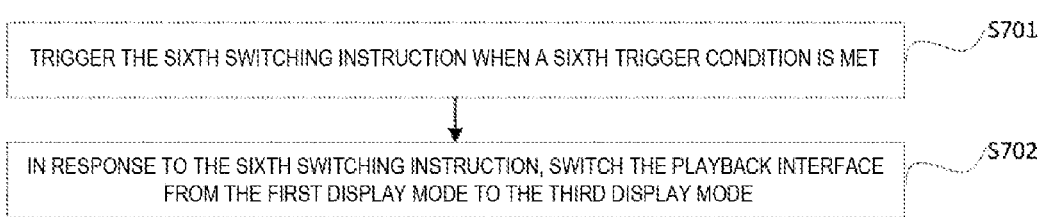
FIG. 15 is a schematic flowchart of a display mode switching method shown according to a still further example embodiment of the present disclosure.
Figure 16:
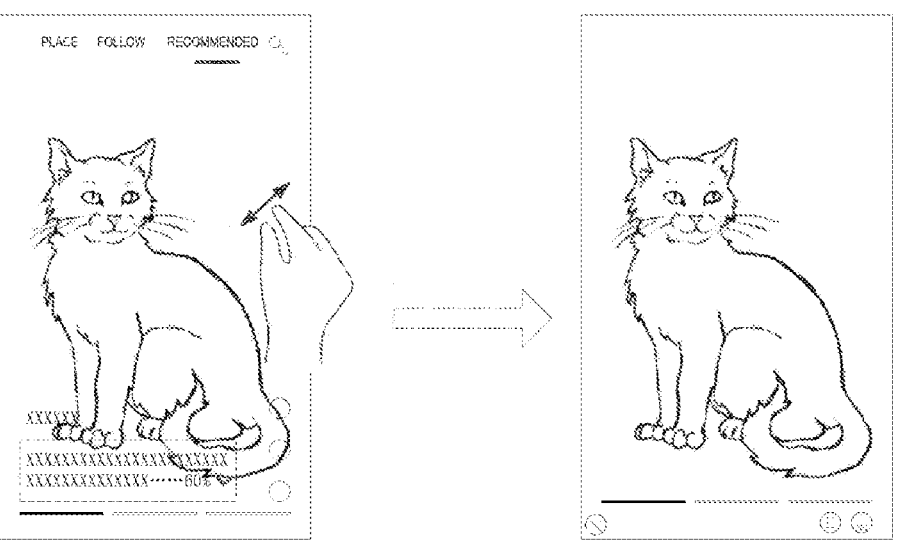
FIG. 16 is a schematic diagram of switching from the first display mode to the third display mode shown according to an example embodiment of the present disclosure.

FIG. 15 is a schematic flowchart of a display mode switching method shown according to a still further example embodiment of the present disclosure. FIG. 16 is a schematic diagram of switching from the first display mode to the third display mode shown according to an example embodiment of the present disclosure. As shown in FIGS. 15 and 16, the display mode switching method provided by the present embodiment comprises:

Step 701: triggering the sixth switching instruction when a sixth trigger condition is met.

Step 702: in response to the sixth switching instruction, switching the play back interface from the first display mode to the third display mode.

It should be understood that the embodiments of the present disclosure do not intend to restrict the sixth trigger condition, which in some embodiments includes a two-finger drag to zoom in on the area of the image to be played.

For example, with reference to FIG. 16, when the two-finger drag to zoom out is performed on the area of the image to be played, the first display mode is switched to the third display mode.

The display mode switching method provided by the embodiments of the present disclosure may switch the play back interface among the first display mode, the second display mode and the third display mode through different switching instructions. In this way, the play back interface may be switched among the different display modes, so that users may adopt different display modes to view the image to be played or read the text to be played.

Figure 17:
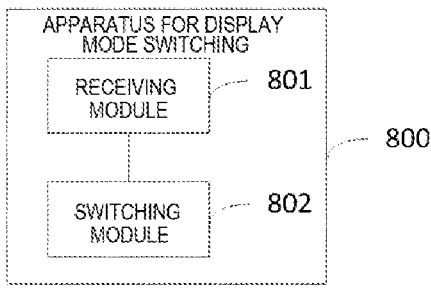
FIG. 17 is a structural schematic diagram of an apparatus for display mode switching shown according to an example embodiment of the present disclosure.

FIG. 17 is a structural schematic diagram of an apparatus for a display mode switching shown in the present disclosure according to an example embodiment. As shown in FIG. 17, an apparatus for display mode switching apparatus 800 provided by the present embodiment comprises:

a receiving module 801, configured to receive a user-triggered switching instruction for a play back interface;

a switching module 802, configured to, in response to the switching instruction, switch the play back interface among a first display mode, a second display mode and a third display mode;

wherein, in the first display mode, text to be played on the play back interface and predetermined controls of the play back interface are hovered over an image to be played on the playback interface: in the second display mode, the playback interface comprises a first play back area and a second play back area, the first play back area being configured to display the image to be played, the second playback area being configured to display the text to be played and the predetermined controls: in the third display mode, the playback interface hides the text to be played and the predetermined controls.

The embodiments of the present disclosure provide a method, an apparatus, a device and a storage medium for display mode switching. By receiving a user-triggered switching instruction for a playback interface, and in response to the switching instruction, the playback interface is switched among a first display mode, a second display mode and a third display mode. In the first display mode, text to be played on the playback interface and predetermined controls of the play back interface are hovered over an image to be played on the play back interface. In the second display mode, the playback interface comprises a first playback area and a second playback area, and the first playback area is configured to display the image to be played. The second playback area is configured to display the text to be played and the predetermined controls. In the third display mode, the playback interface hides the text to be played and the predetermined controls. In this way, the playback interface may be switched among the different display modes, so that users may adopt different display modes to view the image to be played or read the text to be played.

According to one or more embodiments of the present disclosure, if, in the first display mode, a text display area of the playback interface is smaller than an area required to display the text to be played, the text to be played is folded-displayed in the text display area.

According to one or more embodiments of the present disclosure, the text display area is provided with a first control, and the first control is configured to expand the folded-displayed text to be played.

According to one or more embodiments of the present disclosure, text folding information is further displayed in the text display area, and the text folding information is configured to characterize a folding proportion of the text to be played.

According to one or more embodiments of the present disclosure, a second control is further displayed on the playback interface in the third display mode, and the second control is configured to trigger a download instruction for the image to be played after being clicked.

According to one or more embodiments of the present disclosure, in the third display mode, the play back interface is further provided with a third control, the third control, when triggered, is configured to switch the playback interface back to a display mode before a previous switch instruction.

According to one or more embodiments of the present disclosure, the switching instruction comprises a first switching instruction, and the first switching instruction is configured to indicate that the play back interface is switched from the first display mode to the second display mode.

According to one or more embodiments of the present disclosure, the first switching instruction is triggered when a first trigger condition is met, and the first trigger condition comprises clicking on the first control, clicking on the text display area of the play back interface or performing a two-finger drag to zoom in on the text display area.

According to one or more embodiments of the present disclosure, the switching instruction comprises a second switching instruction, and the second switching instruction is configured to indicate that the playback interface is switched from the second display mode to the third display mode.

According to one or more embodiments of the present disclosure, the second switching instruction is triggered when a second trigger condition is met, and the second trigger condition comprises clicking on the first play back area.

According to one or more embodiments of the present disclosure, the switching instruction comprises a third switching instruction, and the third switching instruction is configured to indicate that the play back interface is switched from the third display mode to the first display mode.

According to one or more embodiments of the present disclosure, the third switching instruction is triggered when a third trigger condition is met, and the third trigger condition comprises swiping the image to be played or clicking on the third control.

According to one or more embodiments of the present disclosure, the switching instruction comprises a fourth switching instruction, and the fourth switching instruction is configured to indicate that the play back interface is switched from the third display mode to the second display mode.

According to one or more embodiments of the present disclosure, the fourth switching instruction is triggered when a fourth trigger condition is met, and the fourth trigger condition comprises clicking on the image to be played, performing a two-finger drag to zoom out on the playback interface, clicking on the third control or clicking on a fourth control. The fourth control is configured to switch the playback interface back to the second display mode when triggered.

According to one or more embodiments of the present disclosure, the switching instruction includes a fifth switching instruction, and the fifth switching instruction is configured to indicate that the play back interface is switched from the second display mode to the first display mode.

According to one or more embodiments of the present disclosure, the fifth switching instruction is triggered when a fifth trigger condition is met, and the fifth trigger condition comprises clicking on a fifth control provided on the play back interface in the second display mode. The fifth control is configured to switch the playback interface back to the first display mode when triggered.

According to one or more embodiments of the present disclosure, the switching instruction comprises a sixth switching instruction, and the sixth switching instruction is configured to indicate that the play back interface is switched from the first display mode to the third display mode.

According to one or more embodiments of the present disclosure, the sixth switching instruction is triggered when a sixth trigger condition is met, and the sixth trigger condition comprises performing a two-finger drag to zoom in on an area of the image to be played.

According to one or more embodiments of the present disclosure, the switching module 802 further configured to, in response to a user-triggered change instruction for playback content, change the playback content in the playback interface while maintaining a current display mode, and the current display mode comprises the first display mode, the second display mode or the third display mode.

It is to be noted that the apparatus for display mode switching provided by the embodiments shown in FIG. 17 may be configured to execute the method provided by any of the above embodiments, and the specific implementation and technical effect are similar, thus it will not be repeated here.

Figure 18:
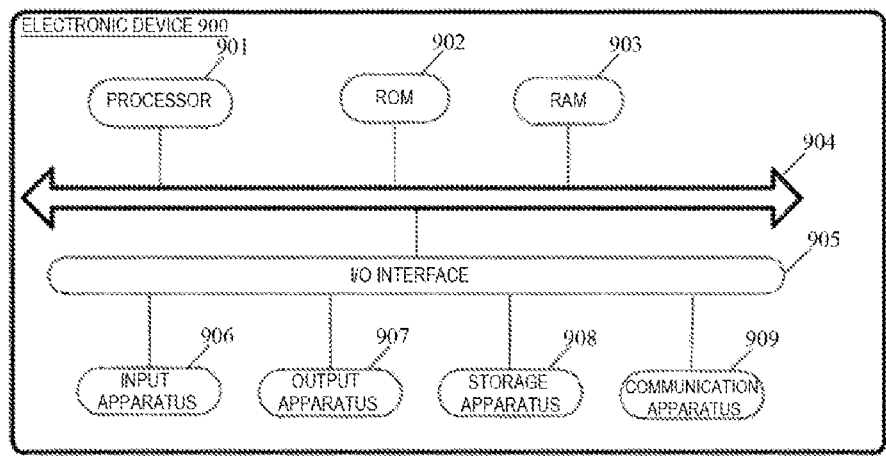
FIG. 18 is a structural schematic diagram of an electronic device shown according to an example embodiment of the present disclosure.

FIG. 18 is a structural schematic diagram of an electronic device shown according to an example embodiment of the present disclosure. As shown in FIG. 18, a schematic diagram of the electronic device 900 suitable for implementing the present embodiments is shown. The electronic device in the embodiments of the present disclosure may include, without limitation to, a mobile terminal such as a mobile phone, a notebook computer, a digital broadcast receiver, PDA (personal digital assistant), PDA (tablet computer), PMP (portable multimedia player) and a vehicle terminal (e.g., a vehicle navigation terminal), and a fixed terminal such as a digital TV and a desktop computer. The electronic device shown in FIG. 18 is merely an example and not intended to limit the functionality and application scope of the embodiments of the present disclosure.

As shown in FIG. 18, the electronic device 900 may comprise a processor (e.g., a central processor, a graphics processor, etc.) 901 which is capable of performing various appropriate actions and processes in accordance with a program stored in a read only memory (ROM) 902 or a program loaded from storage apparatus 908 to a random access memory (RAM) 903. In the RAM 903, there are also stored various programs and data required by the electronic device 900 when operating. The processor 901, the ROM 902 and the RAM 903 are connected to one another via a bus 904. An input/output (I/O) interface 905 is also connected to the bus 904. The memory is configured to store the programs that execute the methods described in the embodiments of each method above: The processor is configured to execute the programs stored in the memory to perform the functions of the embodiments of the present disclosure described above and/or other desired functions.

Usually, the following means are connected to the I/O interface 905: input apparatus 906 including a touch screen, a touch tablet, a keyboard, a mouse, a camera, a microphone, an accelerometer, a gyroscope or the like: output apparatus 907 including a liquid crystal display, a loudspeaker a vibrator or the like: storage apparatus 908, including a magnetic tape, a hard disk or the like: and communication apparatus 909. The communication apparatus 909 allows the electronic device 900 to exchange information/data with other device in a wireless or wired way. Although FIG. 10 shows the electronic device 900 with various means, it should be understood that it does not require to implement or have all the shown means. Alternatively, more or less means may be implemented or comprised.

In particular, the procedures described with reference to the flowchart according to the embodiments of the present disclosure may be implemented as a computer software program. For example, the embodiments of the present disclosure comprise a computer program product, which comprises a computer program carried on a non-transient computer readable medium, the computer program containing program code for performing the method shown in the flowchart. In such an embodiment, the computer program may be downloaded from the network and installed via the communication apparatus 909, or installed from the storage apparatus 908, or installed from the ROM 902. The computer program, when executed by the processor 901, may execute the above functions defined in the method according to the embodiments of the present disclosure. The embodiment of the present disclosure also includes a computer program that, when executed by the processor, performs the functions defined in the method of the present disclosure embodiment.

It is noteworthy that the computer readable medium can be a computer readable signal medium or a computer readable storage medium or any combination thereof. The computer readable storage medium may be, for example, but is not limited to, an electronic, magnetic, optical, electromagnetic, infrared, semiconductor system, means or device, or any suitable combination of the foregoing. More specific examples of the computer readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be configured by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

The above computer readable medium may be included in the above-mentioned electronic device: and it may also exist alone without being assembled into the electronic device.

The computer readable medium carries one or more programs that, when executed by the electronic device, change the display mode of the electronic device.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer via any type of network, including a local area network (LAN) or a wide area network (WAN), or the connection may be made to an external computer (for example, via the Internet using an Internet Service Provider).

In some embodiments, the client and the server can communicate by using any currently known or future developed network protocol such as HTTP (HyperText Transfer Protocol), and can be interconnected with digital data communication (for example, a communication network) in any form or medium. Examples of the communication network include a local area network ("LAN"), a wide area network ("WAN"), an Internet network (for example, the Internet) and an end-to-end network (for example, ad hoc end-to-end network), as well as any currently known or future developed network.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware. Wherein the name of a module does not form any limitation to the unit itself.

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, means or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In a first aspect, according to one or more embodiments of the present disclosure, a method of display mode switching is provided. The method comprises:

receiving a user-triggered switching instruction for a playback interface;

in response to the switching instruction, switching the playback interface among a first display mode, a second display mode and a third display mode;

wherein, in the first display mode, text to be played on the playback interface and predetermined controls of the play back interface are hovered over an image to be played on the playback interface: in the second display mode, the playback interface comprises a first play back area and a second play back area, the first play back area being configured to display the image to be played, the second playback area being configured to display the text to be played and the predetermined controls: in the third display mode, the playback interface hides the text to be played and the predetermined controls.

According to one or more embodiments of the present disclosure, if, in the first display mode, a text display area of the playback interface is smaller than an area required to display the text to be played, the text to be played is folded-displayed in the text display area.

According to one or more embodiments of the present disclosure, the text display area is provided with a first control, and the first control is configured to expand the folded-displayed text to be played.

According to one or more embodiments of the present disclosure, text folding information is further displayed in the text display area, and the text folding information is configured to characterize a folding proportion of the text to be played.

According to one or more embodiments of the present disclosure, a second control is further displayed on the playback interface in the third display mode, and the second control is configured to trigger a download instruction for the image to be played after being clicked.

According to one or more embodiments of the present disclosure, in the third display mode, the playback interface is further provided with a third control, the third control, when triggered, is configured to switch the playback interface back to a display mode before a previous switch instruction.

According to one or more embodiments of the present disclosure, the switching instruction comprises a first switching instruction, and the first switching instruction is configured to indicate that the play back interface is switched from the first display mode to the second display mode.

According to one or more embodiments of the present disclosure, the first switching instruction is triggered when a first trigger condition is met, and the first trigger condition comprises clicking on the first control, clicking on the text display area of the play back interface or performing a two-finger drag to zoom in on the text display area.

According to one or more embodiments of the present disclosure, the switching instruction comprises a second switching instruction, and the second switching instruction is configured to indicate that the playback interface is switched from the second display mode to the third display mode.

According to one or more embodiments of the present disclosure, the second switching instruction is triggered when a second trigger condition is met, and the second trigger condition comprises clicking on the first playback area.

According to one or more embodiments of the present disclosure, the switching instruction comprises a third switching instruction, and the third switching instruction is configured to indicate that the playback interface is switched from the third display mode to the first display mode.

According to one or more embodiments of the present disclosure, the third switching instruction is triggered when a third trigger condition is met, and the third trigger condition comprises swiping the image to be played or clicking on the third control.

According to one or more embodiments of the present disclosure, the switching instruction comprises a fourth switching instruction, and the fourth switching instruction is configured to indicate that the playback interface is switched from the third display mode to the second display mode.

According to one or more embodiments of the present disclosure, the fourth switching instruction is triggered when a fourth trigger condition is met, and the fourth trigger condition comprises clicking on the image to be played, performing a two-finger drag to zoom out on the playback interface, clicking on the third control or clicking on a fourth control. The fourth control is configured to switch the playback interface back to the second display mode when triggered.

According to one or more embodiments of the present disclosure, the switching instruction includes a fifth switching instruction, and the fifth switching instruction is configured to indicate that the play back interface is switched from the second display mode to the first display mode.

According to one or more embodiments of the present disclosure, the fifth switching instruction is triggered when a fifth trigger condition is met, and the fifth trigger condition comprises clicking on a fifth control provided on the play back interface in the second display mode. The fifth control is configured to switch the playback interface back to the first display mode when triggered.

According to one or more embodiments of the present disclosure, the switching instruction comprises a sixth switching instruction, and the sixth switching instruction is configured to indicate that the play back interface is switched from the first display mode to the third display mode.

According to one or more embodiments of the present disclosure, the sixth switching instruction is triggered when a sixth trigger condition is met, and the sixth trigger condition comprises performing a two-finger drag to zoom in on an area of the image to be played.

According to one or more embodiments of the present disclosure, the method further comprises:

in response to a user-triggered change instruction for playback content, changing the play back content in the play back interface while maintaining a current display mode, the current display mode comprising the first display mode, the second display mode or the third display mode.

In a second aspect, according to one or more embodiments of the present disclosure, an apparatus for display mode switching is provided. The apparatus comprises:

a receiving module, configured to receive a user-triggered switching instruction for a play back interface;

a switching module, configured to, in response to the switching instruction, switch the play back interface among a first display mode, a second display mode and a third display mode;

wherein, in the first display mode, text to be played on the playback interface and predetermined controls of the play back interface are hovered over an image to be played on the playback interface: in the second display mode, the play back interface comprises a first play back area and a second playback area, the first play back area being configured to display the image to be played, the second playback area being configured to display the text to be played and the predetermined controls: in the third display mode, the playback interface hides the text to be played and the predetermined controls.

According to one or more embodiments of the present disclosure, if, in the first display mode, a text display area of the playback interface is smaller than an area required to display the text to be played, the text to be played is folded-displayed in the text display area.

According to one or more embodiments of the present disclosure, the text display area is provided with a first control, and the first control is configured to expand the folded-displayed text to be played.

According to one or more embodiments of the present disclosure, text folding information is further displayed in the text display area, and the text folding information is configured to characterize a folding proportion of the text to be played.

According to one or more embodiments of the present disclosure, a second control is further displayed on the playback interface in the third display mode, and the second control is configured to trigger a download instruction for the image to be played after being clicked.

According to one or more embodiments of the present disclosure, in the third display mode, the playback interface is further provided with a third control, the third control, when triggered, is configured to switch the playback interface back to a display mode before a previous switch instruction.

According to one or more embodiments of the present disclosure, the switching instruction comprises a first switching instruction, and the first switching instruction is configured to indicate that the playback interface is switched from the first display mode to the second display mode.

According to one or more embodiments of the present disclosure, the first switching instruction is triggered when a first trigger condition is met, and the first trigger condition comprises clicking on the first control, clicking on the text display area of the play back interface or performing a two-finger drag to zoom in on the text display area.

According to one or more embodiments of the present disclosure, the switching instruction comprises a second switching instruction, and the second switching instruction is configured to indicate that the playback interface is switched from the second display mode to the third display mode.

According to one or more embodiments of the present disclosure, the second switching instruction is triggered when a second trigger condition is met, and the second trigger condition comprises clicking on the first playback area.

According to one or more embodiments of the present disclosure, the switching instruction comprises a third switching instruction, and the third switching instruction is configured to indicate that the playback interface is switched from the third display mode to the first display mode.

According to one or more embodiments of the present disclosure, the third switching instruction is triggered when a third trigger condition is met, and the third trigger condition comprises swiping the image to be played or clicking on the third control.

According to one or more embodiments of the present disclosure, the switching instruction comprises a fourth switching instruction, and the fourth switching instruction is configured to indicate that the play back interface is switched from the third display mode to the second display mode.

According to one or more embodiments of the present disclosure, the fourth switching instruction is triggered when a fourth trigger condition is met, and the fourth trigger condition comprises clicking on the image to be played, performing a two-finger drag to zoom out on the playback interface, clicking on the third control or clicking on a fourth control. The fourth control is configured to switch the playback interface back to the second display mode when triggered.

According to one or more embodiments of the present disclosure, the switching instruction includes a fifth switching instruction, and the fifth switching instruction is configured to indicate that the play back interface is switched from the second display mode to the first display mode.

According to one or more embodiments of the present disclosure, the fifth switching instruction is triggered when a fifth trigger condition is met, and the fifth trigger condition comprises clicking on a fifth control provided on the play back interface in the second display mode. The fifth control is configured to switch the playback interface back to the first display mode when triggered.

According to one or more embodiments of the present disclosure, the switching instruction comprises a sixth switching instruction, and the sixth switching instruction is configured to indicate that the play back interface is switched from the first display mode to the third display mode.

According to one or more embodiments of the present disclosure, the sixth switching instruction is triggered when a sixth trigger condition is met, and the sixth trigger condition comprises performing a two-finger drag to zoom in on an area of the image to be played.

According to one or more embodiments of the present disclosure, the switching module is further configured to, in response to a user-triggered change instruction for playback content, changing the playback content in the playback interface while maintaining a current display mode, the current display mode comprising the first display mode, the second display mode or the third display mode.

In the third aspect, an electronic device is provided by the embodiments of the present disclosure. The electronic device comprises:

a processor; and a memory, configured to store a computer program;

wherein the processor is configured to perform a method of display mode switching of the first aspect of various possible designs of the first aspect by executing the computer program.

In a fourth aspect of the present disclosure, there is provided a computer readable storage medium. Computer execution instructions are stored in the computer readable storage medium, which, when executed by a processor, perform a method of display mode switching of the first aspect and various possible designs of the first aspect.

In a fifth aspect of the present disclosure, there is provided a computer program product. The computer program product comprises a computer program which, when executed by a processor, performs a method of the first aspect and various possible designs of the first aspect.

In a sixth aspect of the present disclosure, there is provided a computer program. The computer program, when executed by a processor, performs a method of the first aspect and various possible designs of the first aspect.

The foregoing description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or method logical acts, it is to be understood that the subject matter defined in the appended claims is not necessarily limited to the specific features or acts described above. On the contrary, the specific features and acts described above are merely example forms of implementing the claims.

We claim:

1. A method of display mode switching, comprising:
obtaining a media content comprising target text and a plurality of target images, wherein a target image of the plurality of target images that is currently displayed is switched by a swiping operation;
displaying the media content on a playback interface;
receiving a switching instruction for the playback interface;
in response to the switching instruction, performing a switching operation corresponding to the switching instruction, the switching operation comprising switching a display mode of the playback interface of the media content among any two of a first display mode, a second display mode and a third display mode, wherein, in the first display mode, the target text on the playback interface and predetermined controls of the playback interface are hovered over the target image on the playback interface; in the second display mode, the playback interface comprises a first playback area and a second playback area, the first playback area being configured to display the target image, the second playback area being configured to display the target text and the predetermined controls; in the third display mode, the playback interface hides the target text and the predetermined controls, and wherein the target text corresponds to the target image, wherein in the first display mode, the playback interface comprises a text display area to display the target text, and in accordance with a determination that the text display area is smaller than an area required to display the target text, the target text is folded in the text display area, and wherein at an end of the text display area, a first control configured to expand the folded target text is displayed, and in response to clicking on the first control, the display mode of the playback interface is switched from the first display mode to the second display mode to display the target text unfolded, and wherein in the third display mode, the playback interface is further provided with a third control, and based on that the third display mode is switched from the first display mode and the third control is activated, the playback interface is switched to the first display mode, and based on that the third display mode is switched from the second display mode and the third control is activated, the playback interface is switched to the second display mode, and wherein a second control is further displayed on the playback interface in the third display mode, the second control being configured to trigger a download instruction for the target image after being clicked, wherein different colors of the second control correspond to different permissions to trigger the download instruction.

2. The method of claim 1, wherein, in the first display mode, if a text display area of the playback interface is smaller than an area required to display the target text, the target text is folded-displayed in the text display area.

3. The method of claim 2, wherein the text display area is provided with a first control, the first control being configured to expand the folded-displayed target text.

4. The method of claim 2, wherein text folding information is further displayed in the text display area, the text folding information being configured to characterize a folding proportion of the target text.

5. The method of claim 1, wherein the switching instruction comprises a first switching instruction, the first switching instruction being configured to indicate that the playback interface is switched from the first display mode to the second display mode.

6. The method of claim 5, wherein the first switching instruction is triggered when a first trigger condition is met, the first trigger condition comprising clicking on the first control, clicking on the text display area of the playback interface or performing a two-finger drag to zoom in on the text display area.

7. The method of claim 1, wherein the switching instruction comprises a second switching instruction, the second switching instruction being configured to indicate that the playback interface is switched from the second display mode to the third display mode.

8. The method of claim 7, wherein the second switching instruction is triggered when a second trigger condition is met, the second trigger condition comprising clicking on the first playback area.

9. The method of claim 1, wherein the switching instruction comprises a third switching instruction, the third switching instruction being configured to indicate that the playback interface is switched from the third display mode to the first display mode.

10. The method of claim 9, wherein the third switching instruction is triggered when a third trigger condition is met, the third trigger condition comprising swiping the target image or clicking on the third control.

11. The method of claim 1, wherein the switching instruction comprises a fourth switching instruction, the fourth switching instruction being configured to indicate that the playback interface is switched from the third display mode to the second display mode.

12. The method of claim 11, wherein the fourth switching instruction is triggered when a fourth trigger condition is met, the fourth trigger condition comprising clicking on the target image, performing a two-finger drag to zoom out on the playback interface, clicking on the third control or clicking on a fourth control, the fourth control being configured to switch the playback interface back to the second display mode when triggered.

13. The method of claim 1, wherein the switching instruction includes a fifth switching instruction, the fifth switching instruction being configured to indicate that the playback interface is switched from the second display mode to the first display mode.

14. The method of claim 13, wherein the fifth switching instruction is triggered when a fifth trigger condition is met, the fifth trigger condition comprising clicking on a fifth control provided on the playback interface in the second display mode, the fifth control being configured to switch the playback interface back to the first display mode when triggered.

15. The method of claim 1, wherein the switching instruction comprises a sixth switching instruction, the sixth switching instruction being configured to indicate that the playback interface is switched from the first display mode to the third display mode.

16. The method of claim 15, wherein the sixth switching instruction is triggered when a sixth trigger condition is met, the sixth trigger condition comprising performing a two-finger drag to zoom in on an area of the target image.

17. The method of claim 1, wherein the method further comprises:

in response to a user-triggered change instruction for playback content, changing the playback content in the playback interface while maintaining a current display mode, the current display mode comprising the first display mode, the second display mode or the third display mode.

18. The method of claim 1, wherein in the first display mode, a comment control for enabling a comment function is displayed on the playback interface.

19. An electronic device, comprising:

a processor; and a memory, configured to store a computer program;

wherein the processor is configured to perform operations comprising:

obtaining a media content comprising target text and a plurality of target images, wherein a target image of the plurality of target images that is currently displayed is switched by a swiping operation;

displaying the media content on a playback interface;

receiving a user-triggered switching instruction for a playback interface;

in response to the switching instruction, perform a switching operation corresponding to the switching instruction, the switching operation comprising switching a display mode of the playback interface of the media content among any two of a first display mode, a second display mode and a third display mode, wherein, in the first display mode, the target text on the playback interface and predetermined controls of the playback interface are hovered over the target image on the playback interface; in the second display mode, the playback interface comprises a first playback area and a second playback area, the first playback area being configured to display the target image, the second playback area being configured to display the target text and the predetermined controls; in the third display mode, the playback interface hides the target text and the predetermined controls, and wherein the target text corresponds to the target image, wherein in the first display mode, the playback interface comprises a text display area to display the target text, and in accordance with a determination that the text display area is smaller than an area required to display the target text, the target text is folded in the text display area, and wherein at an end of the text display area, a first control configured to expand the folded target text is displayed, and in response to clicking on the first control, the display mode of the playback interface is switched from the first display mode to the second display mode to display the target text unfolded, and wherein in the third display mode, the playback interface is further provided with a third control, and based on that the third display mode is switched from the first display mode and the third control is activated, the playback interface is switched to the first display mode, and based on that the third display mode is switched from the second display mode and the third control is activated, the playback interface is switched to the second display mode, and wherein a second control is further displayed on the playback interface in the third display mode, the second control being configured to trigger a download instruction for the target image after being clicked, wherein different colors of the second control correspond to different permissions to trigger the download instruction.

20. The electronic device of claim 19, wherein in the first display mode, a comment control for enabling a comment function is displayed on the playback interface.

* * * * *